United States Patent
Gous et al.

(10) Patent No.: US 11,329,994 B2
(45) Date of Patent: May 10, 2022

(54) REMOTE AUTHORIZATION OF GATEWAY DEVICE

(71) Applicant: Luna XIO, Inc., Palo Alto, CA (US)

(72) Inventors: Alan Gous, Palo Alto, CA (US); Jeffrey Bazar, San Francisco, CA (US); Arman Maghbouleh, Mountain View, CA (US)

(73) Assignee: Luna XIO, Inc., Palo Alto, CA (US)

( * ) Notice: Subject to any disclaimer, the term of this patent is extended or adjusted under 35 U.S.C. 154(b) by 0 days.

(21) Appl. No.: 16/896,712

(22) Filed: Jun. 9, 2020

(65) Prior Publication Data

US 2020/0389465 A1 Dec. 10, 2020

Related U.S. Application Data

(60) Provisional application No. 62/859,247, filed on Jun. 10, 2019.

(51) Int. Cl.
*H04L 29/06* (2006.01)
*H04L 12/66* (2006.01)
*H04W 12/63* (2021.01)

(52) U.S. Cl.
CPC ............ *H04L 63/108* (2013.01); *H04L 12/66* (2013.01); *H04W 12/63* (2021.01)

(58) Field of Classification Search
CPC ... H04L 12/66; H04L 63/0884; H04L 63/107; H04L 63/108; H04W 12/0433; H04W 12/75; H04W 12/084; H04W 12/63; H04W 12/009; G06F 21/44; G06F 21/6245
See application file for complete search history.

(56) References Cited

U.S. PATENT DOCUMENTS

| | | | |
|---|---|---|---|
| 9,002,270 B1 | 4/2015 | Hewinson | |
| 9,092,898 B1 | 7/2015 | Fraccaroli et al. | |
| 9,311,586 B2 | 4/2016 | Robinette et al. | |
| 9,357,053 B2 | 5/2016 | Gruberman et al. | |

(Continued)

FOREIGN PATENT DOCUMENTS

| | | |
|---|---|---|
| CN | 104105947 B | 2/2018 |
| CN | 105264827 B | 4/2019 |

(Continued)

OTHER PUBLICATIONS

"International Application Serial No. PCT/US2020/036782, International Preliminary Report on Patentability dated Jun. 8, 2021", 11 pgs.

(Continued)

*Primary Examiner* — Tri M Tran
(74) *Attorney, Agent, or Firm* — Schwegman Lundberg & Woessner, P.A.

(57) ABSTRACT

An example method for the remote authorization of a gateway to communicate with a device includes accessing time interval data, specified by an owner of the device, the time interval data specifying an access authorization time interval. A calculation is performed, using at least one processor, to generate authorization data that is specific to the device and valid for the access authorization time interval. The authorization data is accessed using the gateway. A scanning function is performed using the gateway, the scanning function to locate the device. A control request is sent to device to control the device.

10 Claims, 11 Drawing Sheets

(56) References Cited

U.S. PATENT DOCUMENTS

| | | |
|---|---|---|
| 9,454,889 B2 | 9/2016 | Kerning |
| 9,525,971 B1 | 12/2016 | Vega et al. |
| 9,602,193 B1 | 3/2017 | Mendelson |
| 9,626,841 B2 | 4/2017 | Fadell et al. |
| 9,640,055 B2 | 5/2017 | Fadell et al. |
| 9,652,912 B2 | 5/2017 | Fadell et al. |
| 9,711,036 B2 | 7/2017 | Fadell et al. |
| 9,848,299 B1 | 12/2017 | Kumar et al. |
| 9,934,691 B2 | 4/2018 | Millspaugh |
| 9,953,514 B2 | 4/2018 | Fadell et al. |
| 9,954,961 B1 | 4/2018 | Diem |
| 9,960,929 B2 | 5/2018 | Fadell et al. |
| 9,961,507 B1 | 5/2018 | Mendelson |
| 10,002,515 B2 | 6/2018 | De Barros Chapiewski et al. |
| 10,070,309 B2 | 9/2018 | Patterson |
| 10,102,734 B2 | 10/2018 | Kumar et al. |
| 10,225,688 B2 | 3/2019 | Skomra et al. |
| 10,286,842 B2 | 5/2019 | Penilla et al. |
| 10,423,926 B1 | 9/2019 | Nagpal et al. |
| 10,506,386 B1 | 12/2019 | De La Broise et al. |
| 10,613,185 B2 | 4/2020 | De La Broise et al. |
| 10,623,249 B2 | 4/2020 | Chapiewski et al. |
| 10,631,133 B2 | 4/2020 | Mahmoud et al. |
| 10,638,262 B2 | 4/2020 | Farley et al. |
| 10,645,538 B1 | 5/2020 | Klinkner et al. |
| 10,952,077 B1* | 3/2021 | Holt ...................... H04W 12/08 |
| 2009/0201149 A1 | 8/2009 | Kaji |
| 2010/0098249 A1 | 4/2010 | Shin et al. |
| 2011/0112969 A1 | 5/2011 | Zaid et al. |
| 2015/0112885 A1 | 4/2015 | Fadell et al. |
| 2017/0041316 A1* | 2/2017 | Setchell .............. H04L 63/0876 |
| 2017/0061404 A1 | 3/2017 | Tunnell et al. |
| 2017/0067747 A1 | 3/2017 | Ricci |
| 2017/0142128 A1 | 5/2017 | Mccormack et al. |
| 2017/0238145 A1 | 8/2017 | Ferrell |
| 2019/0215652 A1 | 7/2019 | Chapiewski et al. |
| 2019/0235092 A1 | 8/2019 | Bastian, II et al. |
| 2020/0112819 A1 | 4/2020 | Lévêque et al. |
| 2021/0344685 A1 | 11/2021 | Gous et al. |

FOREIGN PATENT DOCUMENTS

| | | |
|---|---|---|
| EP | 3122017 | 1/2017 |
| EP | 3203703 | 8/2017 |
| ES | 2752007 T3 | 4/2020 |
| WO | WO-2016057678 A1 | 4/2016 |
| WO | 2017027487 | 2/2017 |
| WO | WO-2020251929 A1 | 12/2020 |

OTHER PUBLICATIONS

"The Clever Cryptography Behind Apple's 'Find My' Feature", Wired.com, (Jun. 5, 2019), 3 pgs.

"International Application Serial No. PCT US2020 036782, International Search Report dated Aug. 31, 2020", 5 pgs.

"International Application Serial No. PCT US2020 036782, Written Opinion dated Aug. 31, 2020", 8 pgs.

"U.S. Appl. No. 17/375,862, Corrected Notice of Allowability dated Sep. 29, 2021", 2 pgs.

"U.S. Appl. No. 17/375,862, Notice of Allowance dated Feb. 7, 2022", 19 pgs.

"U.S. Appl. No. 17/375,862, Notice of Allowance dated Sep. 17, 2021", 19 pgs.

* cited by examiner

REMOTE AUTHORIZATION OF GATEWAY DEVICE

CROSS-REFERENCE TO RELATED APPLICATIONS

This patent application claims the benefit of priority, under 35 U.S.C. Section 119(e), to Alan Gous et al., U.S. Provisional Patent Application Ser. No. 62/859,247 entitled "METHOD AND SYSTEM FOR ANONYMOUS AND SECURE COMMUNICATION, AND REMOTE AUTHORIZATION, IN AN AD HOC NETWORK OF DEVICES, GATEWAYS AND DEVICE OWNERS," filed on Jun. 10, 2019, which is incorporated by reference in its entirety.

BACKGROUND

Small, inexpensive, mobile, battery-operated radio devices ("small devices") are currently used for applications such as location tracking, environmental sensing, activity monitoring, and control of isolated mechanical devices: lights, locks, etc. The networking protocols and backend servers supporting these devices tend to fall into two areas. First, there are the closed networks whose infrastructure (gateways and servers) are provided, all in one, as a complete solution for coverage of specific geographic areas, for specific purposes. These networks are able to use many existing security protocols to keep the device communications secure. Second, there are partially or fully "ad hoc" networks, in which infrastructure is shared between different individuals or organizations. Devices, gateways, and other infrastructure are not formally configured into the network but participate voluntarily and when available, potentially over wide geographic areas. Such networks can be used simultaneously for a variety of different applications.

Privacy and Security risks restrict the adoption of these ad hoc networks. In general, it is not possible to establish secure communication channels between all participants, and data or "meta-data" can leak. Some examples: Participants in the network, or outside eavesdroppers, can often establish ownership of devices, even if the contents of the communications are not known. This is a privacy vulnerability for the owners. Gateways can aid in location tracking of nearby devices by augmenting device data with the gateway's location information. But doing so can violate the gateways' privacy. Devices that can be controlled by their owner computer systems through local gateways are at risk of being hijacked by those gateways.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
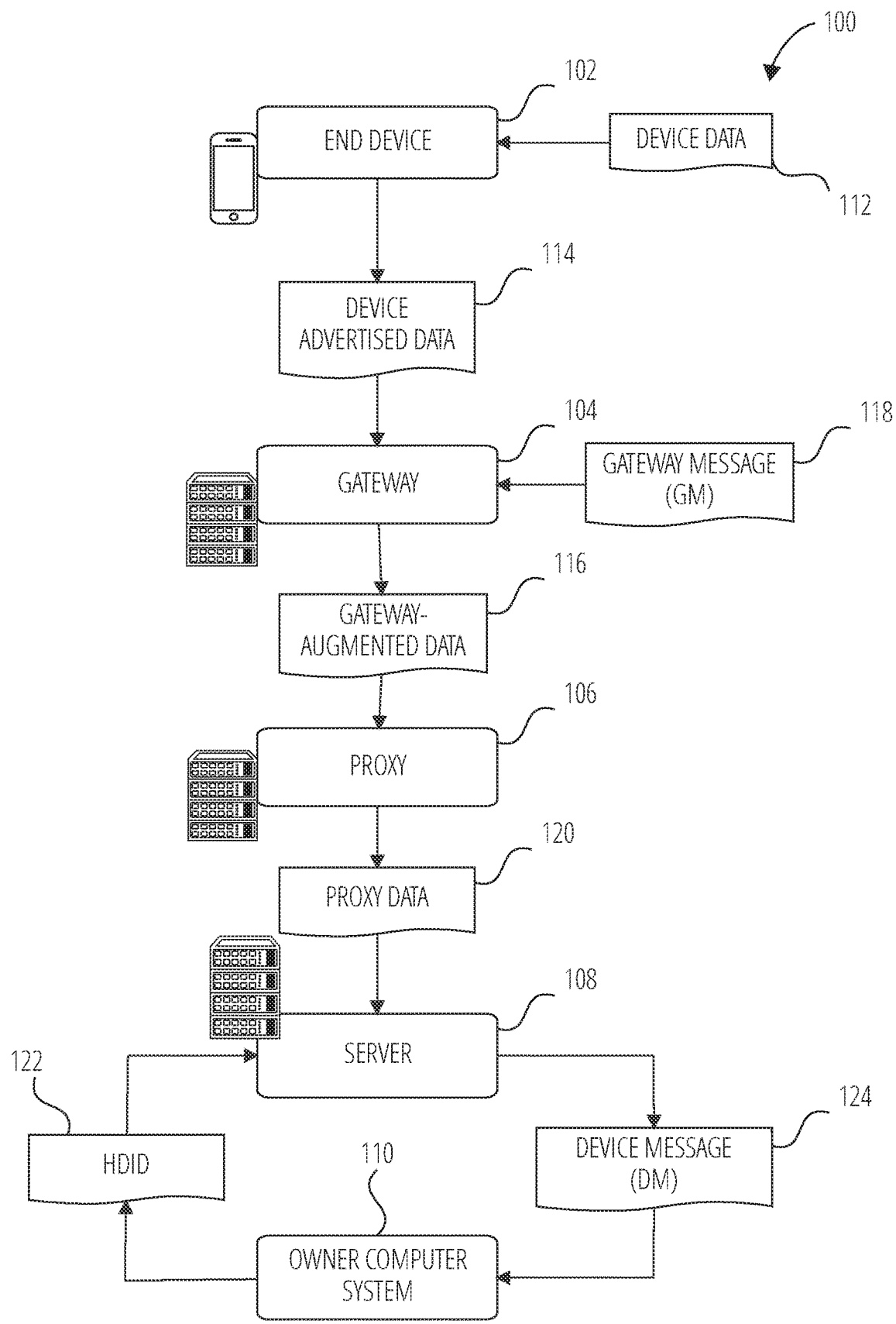
FIG. 1 illustrates an overview of device data submission and owner retrieval, in accordance with some examples.

Example methods and systems for anonymous and secure communication, and remote authorization, in an ad hoc network of devices, gateways, and device owner computer systems are described. In the following description, for purposes of explanation, numerous specific details are set forth in order to provide a thorough understanding of the examples of the present invention. It will be evident, however, to one skilled in the art that other embodiments of the present invention may be practiced without these specific details.

Methods are described for the construction and operation of an ad hoc network of these small devices, together with gateways and backend infrastructure, that supports open participation from different individuals or organizations. This design protects the privacy of the participants, and security of the network. For example: the association between owner computer systems and their devices is not revealed to other participants. Gateways can participate while maintaining their privacy. Devices can be controlled securely by their owner computer systems, through gateways local to the end devices.

Section 1: General Description of the System and Terminology

A Device Owner ("owner"), or owner computer system, controls one or more End Devices ("end devices"). "Controls" includes having the ability to determine what software or firmware on the end device is installed and how it is initialized, and in particular to control how the end device operates and communicates over a network, after this initialization. An owner computer system can control more than one end device (the "owner's devices"), and an end device can be controlled by more than one owner (e.g., "owner computer systems"). During operation, end devices may be physically separate from the owner computer systems.

There are one or more "gateways," gateway devices, or access points, which serve as intermediaries for communication between the owner computer systems and the end devices.

The gateway devices may not be under the control of the owner computer systems. For example, the gateway devices may belong to a different individual or organization from the owners. The term "gateway" may be used to refer to either the gateway device or the individual or organization controlling that gateway device.

Communication between devices and gateways may be through one medium, for example radio communication, and communication between gateways and devices may be through another medium, for example, an IP network.

The network is described as "ad hoc," in that there is not necessarily any fixed connectivity between the end devices, gateways, and owner computer systems. Gateways may choose to participate in the network during some periods of time and not others, and without notifying other participants in the network. Also, gateways, devices, and owner computer systems may change physical locations during the operation of the network, so that some communication, for example the radio communication between devices and gateways, becomes available or unavailable at different times.

Specific devices of interest are Bluetooth Low Energy (BLE) beacons or tracking devices, devices using the LoRa (Long Range) radio communication protocol, and other low-complexity mobile devices with limited bandwidth available for transmission. Specific gateways of interest are mobile phones, carried by users who are unknown to the device owner. Other specific gateways of interest are BLE-enabled IP access points installed in fixed locations.

In the process of forwarding data from the end device to the owner computer system, gateways may append additional data about the end device that is of interest to the owner computer system. An example of this additional data is location data (obtained, for example, by using the gateway location as a proxy for the end device location) or the exact time at which signals were received from the end device by the gateway. The gateway is able to communicate this data to the owner, together with the data from the end device.

One of the example goals of the methods and systems described here is to allow communication of data from the end device to the owner computer system, through the gateways, under specific privacy, anonymity, and other security restrictions. Details of this example goal are described in Section 2.

The example goals described in Section 2 restrict a gateway from being able to identify that an end device, whose data it is receiving, augmenting, and forwarding, is under the control of, or in communication with, a specific owner computer system. The security requirements also specify that the gateway is unable to even identify whether the end device from which it receives data at some period of time is the same device, or a different device, from which it receives data at some later period of time. In addition, having access to data on the server is not sufficient to identify which devices or gateways from which an owner computer system is obtaining information.

However, there are specific circumstances in which an owner computer system may wish to provide temporary authorization to one or more gateways, which does give the gateways the ability to identify the end devices as described above. Specifically, the owner computer system may wish to specify some time interval, and provide authorizations to gateways to be able to identify one or more of the owner's end devices during that time interval. That means that during this time interval, through the data they receive from these end devices, the gateways can identify that these end devices belong to the owner computer system.

Furthermore, the owner computer system may wish to provide the gateways with the ability, during this time interval but not otherwise, to control the end devices in some way.

Another of the example goals of the methods and systems described here is to allow an owner computer system to temporarily authorize gateways to identify and control the owner's end devices, as described above.

Section 2: Anonymity and Other Security Requirements: Specification

The anonymity and security requirements, that are fulfilled by the example methods and systems described here, fall into two areas.

The first example goal is to protect the owners (e.g., owner computer systems) of the end devices from any third-party having knowledge of communications between a device and an owner. This includes not only knowledge of the data sent from the end device to the owner computer system, but even of any connection between the end device and the owner computer system at all (sometimes called "meta-data"), since knowledge of location of a tracking device or beacon, together with an identification of the owner computer system of that end device, can in itself reveal information concerning the owner computer system.

Example anonymity and security requirements for an owner computer systems can be summarized as follows:

1. No other party, besides the end device's owner computer systems, can identify that an end device is sending data to those owner computer systems. These other parties include:
   a. Eavesdroppers on the radio communication.
   b. The gateway, and
   c. Any intermediaries in the IP channel connecting the gateway to the user. In particular, any organization controlling servers storing the communications between the end device and the owner computer system.
2. No other party, besides the device's owner computer systems, can identify that any two communications from a single end device, separated by some small interval in time, are in fact from a single end device and not from two different end devices.
3. No other end device, besides an owner's devices, can imitate or spoof an owner's end device on the network, in such a way that the owner computer system does not know whether data received from one of that owner's devices is authentic or not.

The example networks described here, as explained in the previous section, may be ad hoc. These networks may rely on the availability and willingness of gateways to relay data from devices to owner computer systems, and potentially to control devices on behalf of the owner computer systems. The example networks also provide for augmentation of the data sent from devices to owner computer systems with data from the gateways. The willingness of the gateways to participate may depend on the protection of the anonymity and security of these gateways, particularly if they are private individuals.

Another example security requirement can therefore be stated as follows: No party can know that a specific gateway and a specific owner computer system are communicating with each other, unless authorized by the owner computer system and the gateway. In particular, the owner computer system does not know (e.g., store) the identity of the gateway it is communicating with, and vice versa. This applies to communicating for purposes of data transfer from end device to user, or gateway to user, or the providing of permissions from user to gateway to receive data from or operate the end device.

Section 3: Description of the Drawings

Figure 2:
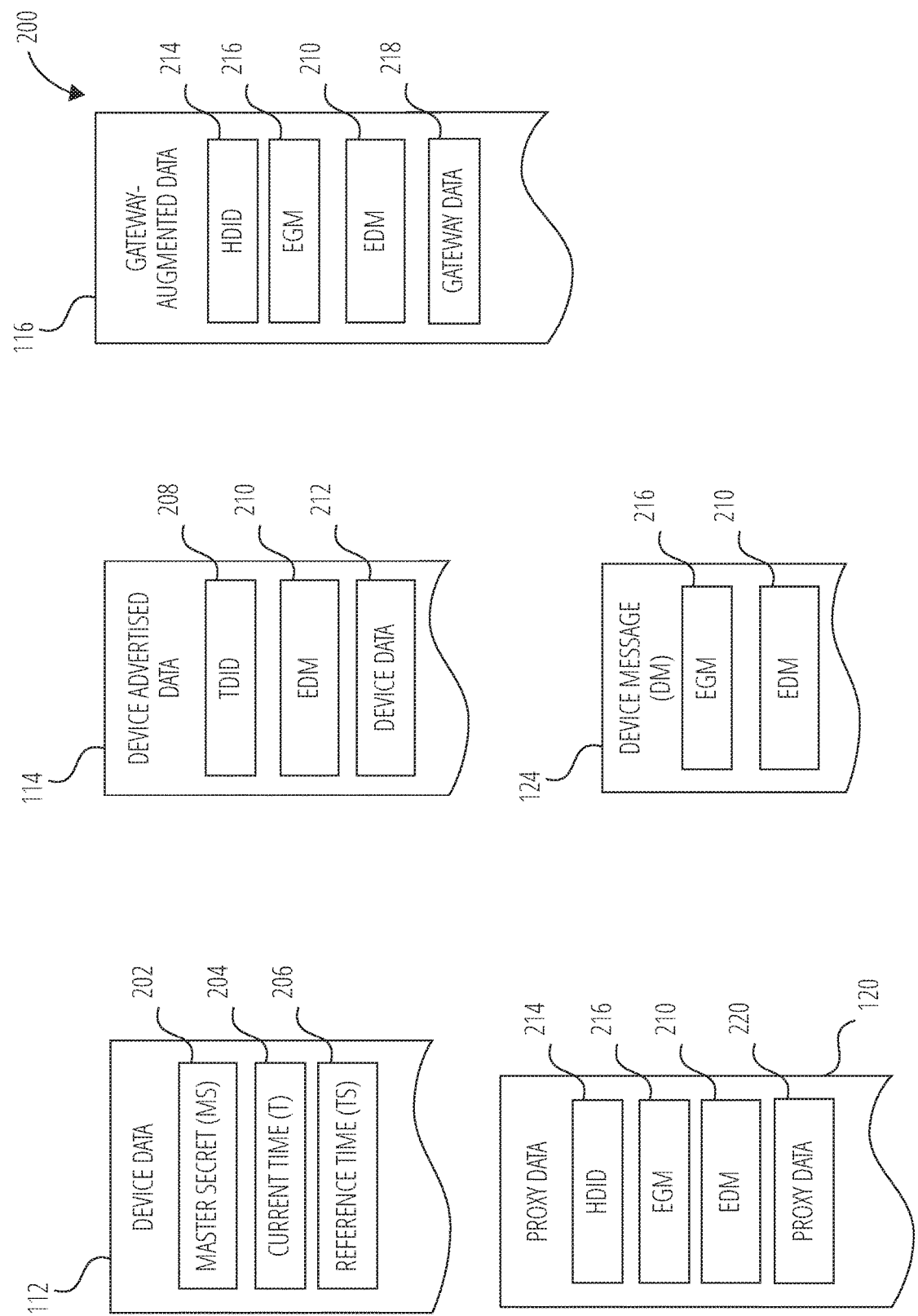
FIG. 2 illustrates data structures 200 in accordance with some examples.

FIG. 1 and FIG. 2: Overview of Device Data Submission and Owner Retrieval FIG. 1 and FIG. 2 provide an overview of an example system 100 at the highest level. A single communication path between an end device 102, a gateway 104, and an owner computer system 110 is represented, although as discussed above, there may be multiple such communication paths between multiple devices, gateways, and owner computer systems. Two other components are represented: a server 108 and a proxy 106. The system 100 will be explained with the assumption that there is a single server 108, and a single proxy 106 serving all devices, gateways, and owner computer systems.

In on operation prior to that represented in FIG. 1, called "onboarding", the owner computer system 110 and the end device 102 agree on a master secret (MS) 202 "(MS), not shared with any other component of the system, and a reference time (TS) 206 (TS). The sharing of master secret (MS) 202 can be done in a standard way, such as Diffie-Helman key exchange over some communication channels. This sharing can be done directly, during onboarding, and there is no need for the system 100 described here in order to achieve this operation. This and subsequent figures represent the operation of the system 100 after onboarding.

After onboarding, the end device 102 contains device data 112 shown in more detail in FIG. 2 and which includes:
1. the master secret (MS) 202;
2. the current time (T) 204: and
3. a reference time (TS) 206, for example, and onboarding time.

Figure 3:
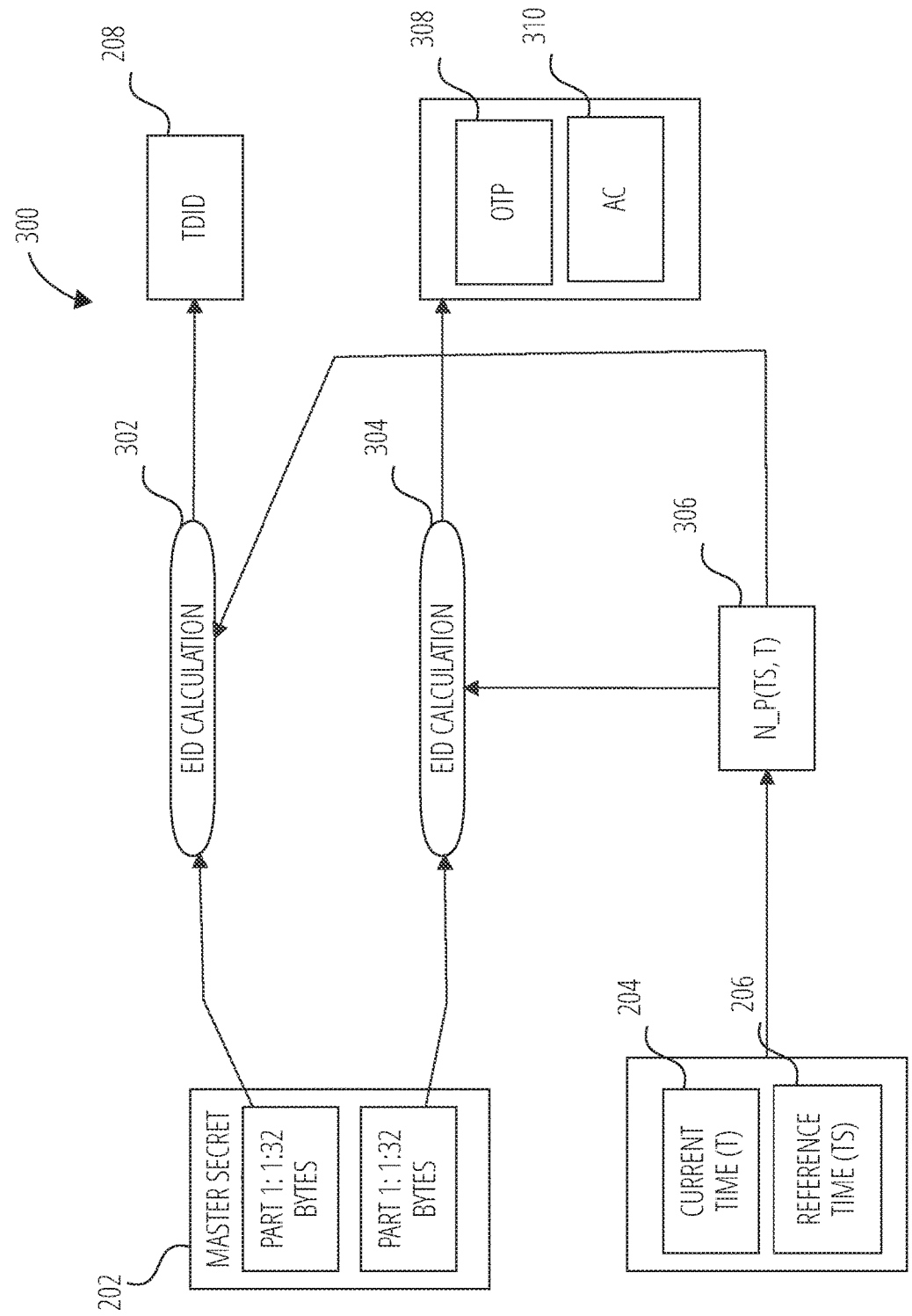
FIG. 3 illustrates a method 300 for calculation of time-dependent data, in accordance with some examples.

From these, as detailed in FIG. 3, the end device 102 periodically advertises device advertised data 114 that are derived from master secret (MS) 202, the current time (T) 204, and the reference time (TS) 206, and periodically change their values (in ways that are unpredictable without knowledge of master secret (MS) 202. The device advertised data 114 is shown in FIG. 2 to include:
1. a time-dependent identifier (TDID) 208), of the end device 102,
2. an encrypted device message (EDM) 210, which contains data that the device wishes to send to the owner,
3. Potentially other device data 212, necessary for the identification of the end device 102 as conforming to the protocol as described here, or lower layer data used by the advertising protocol itself.

The device advertised data 114 is received by the gateway 104, which processes the data as described in FIG. 3. The gateway 104 augments the device advertised data 114 received from the end device 102 with other gateway data 218, which may contain, for example, gateway or device location information, or the time that the advertisement was received by the gateway, to generate gateway-augmented data 116.

Note that if, for example, the end device 102 is advertising using radio signals, and one such signal is received by multiple gateways which record and forward the receiving time, then these times, together with estimates of radio signal speeds, can be used to aid the geolocation of the device.

This operation of the gateway 104 results in the gateway-augmented data 116, which includes:
1. a hashed device identifier (HDID) 214, the hashed ID of the device;
2. an encrypted gateway message (EGM) 216;
3. an encrypted device message (EDM) 210, the (forwarded) encrypted device message,
4. other gateway data 218, for example, lower layer data, provided by the transmission protocol such as the IP address of the gateway 104

The gateway-augmented data 116 is passed through the proxy 106, which removes any identifying gateway data from the gateway-augmented data 116 and forwards the remainder as proxy-augmented data 120 to the server 108. So, the proxy-augmented data 120 outputted by the proxy 106 contains the same fields as gateway-augmented data 116, but the other gateway data 218 (e.g., the lower-level gateway data) has been replaced by lower-level data supplied by the proxy 106. For example, the IP address of the gateway 104 will be replaced by the IP address of the proxy 106. The proxy 106 is assumed not to share any information with the server 108, besides the data in the other gateway data 218, to ensure that the gateway 104 remains anonymous to the server 108, and use of the data by the server 108 (for example which owner requests this information) is not known by the proxy 106.

The server 108 stores this data for a period of time. The owner computer system 110 of the end device 102 can request the data from the server 108 by specifying the hashed device identifier (HDID) 214. If the server 108 contains a record with this hashed device identifier (HDID) 214, the server 108 can return the encrypted gateway message (EGM) 216 and encrypted device message (EDM) 210 to the owner computer system 110. The owner computer system 110 knows the master secret (MS) 202 and so can decrypt all this data.

FIG. 3: Calculation of Time-Dependent Data

The example system 100 uses the master secret (MS) 202, shared between the end device 102 and the owner computer system 110, into certain time-dependent fields, which can only be predicted if the master secret (MS) 202 is known.

The master secret (MS) 202 is, in this example, a number of 64-bytes in length. The master secret (MS) 202 is divided into two parts, of 32 bytes each. At any point in time, the system 100 also knows the current time (T) 204 (T), and some reference time (TS) 206 (TS) that is, like the master secret (MS) 202, shared between the end device 102 and the owner computer system 110. The reference time (TS) 206 may be the time at which onboarding occurred.

From current time (T) 204 and reference time (TS) 206, the system 100 calculates N_P (TS, T) 306. This is the number of periods of time of length P that have elapsed between the reference time (TS) 206 and the current time (T) 204. N_P is used, together with the two 32-byte parts of the master secret (MS) 202, by two "Ephemeral ID" EID calculations (EID calculation 302 and EID calculation 304). These calculations can, for example, follow the method in:

https://github.com/google/eddystone/blob/master/eddystone-eid/eid-computation.md in which:
1. The "identity key" described there is one of the two 32-byte (128 bit) parts of the master secret;
2. The number of periods P is called the "rotation period", and is of the form 2^K, where K is the "rotation exponent": and
3. The result is not truncated to 16 bytes to form the EID, as described in the reference, but instead the entire 32-byte output is kept.

Figure 6:
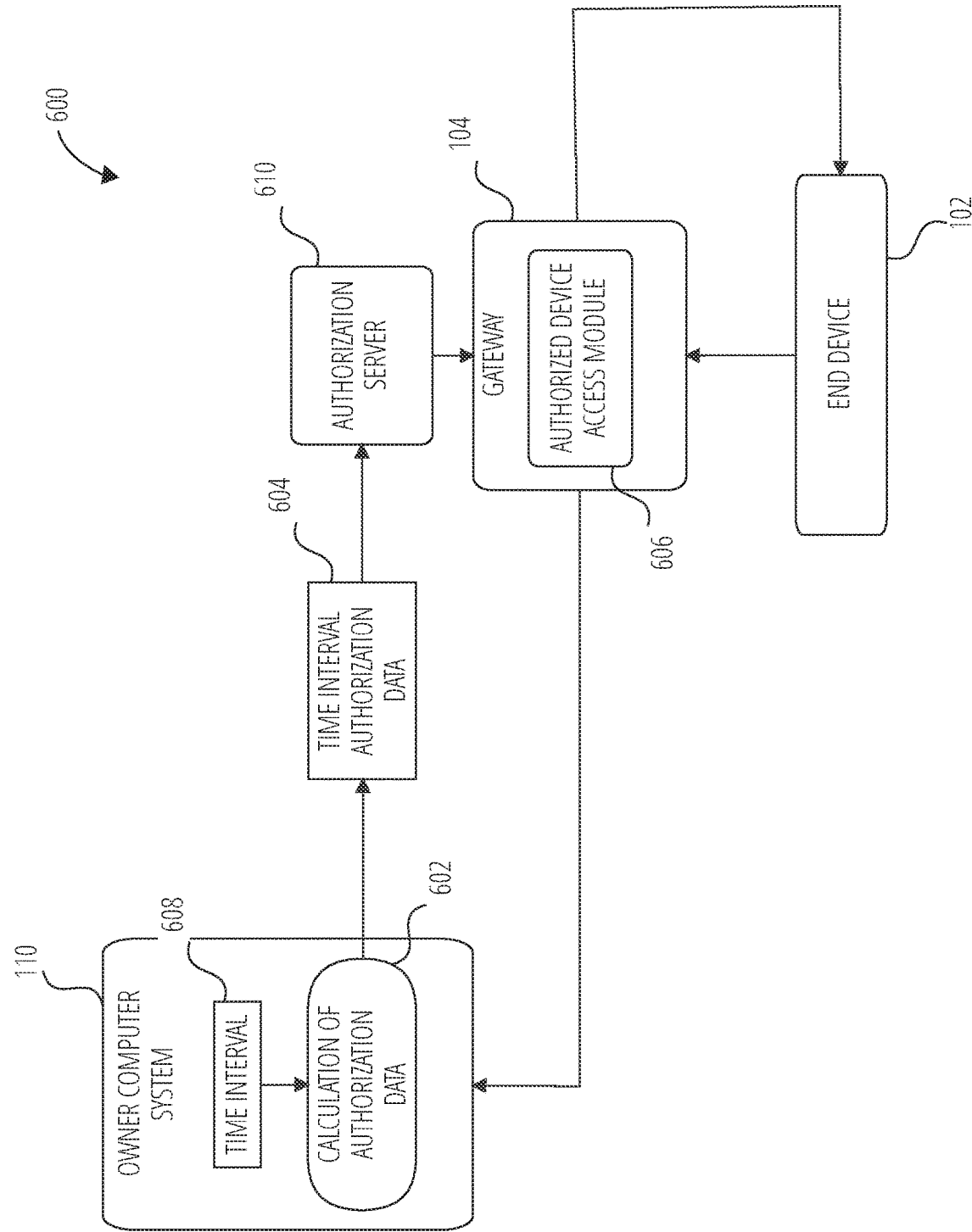
FIG. 6 illustrates methods 600 for owner authorization of gateway to scan for device and/or control device, in accordance with some examples.
Figure 7:
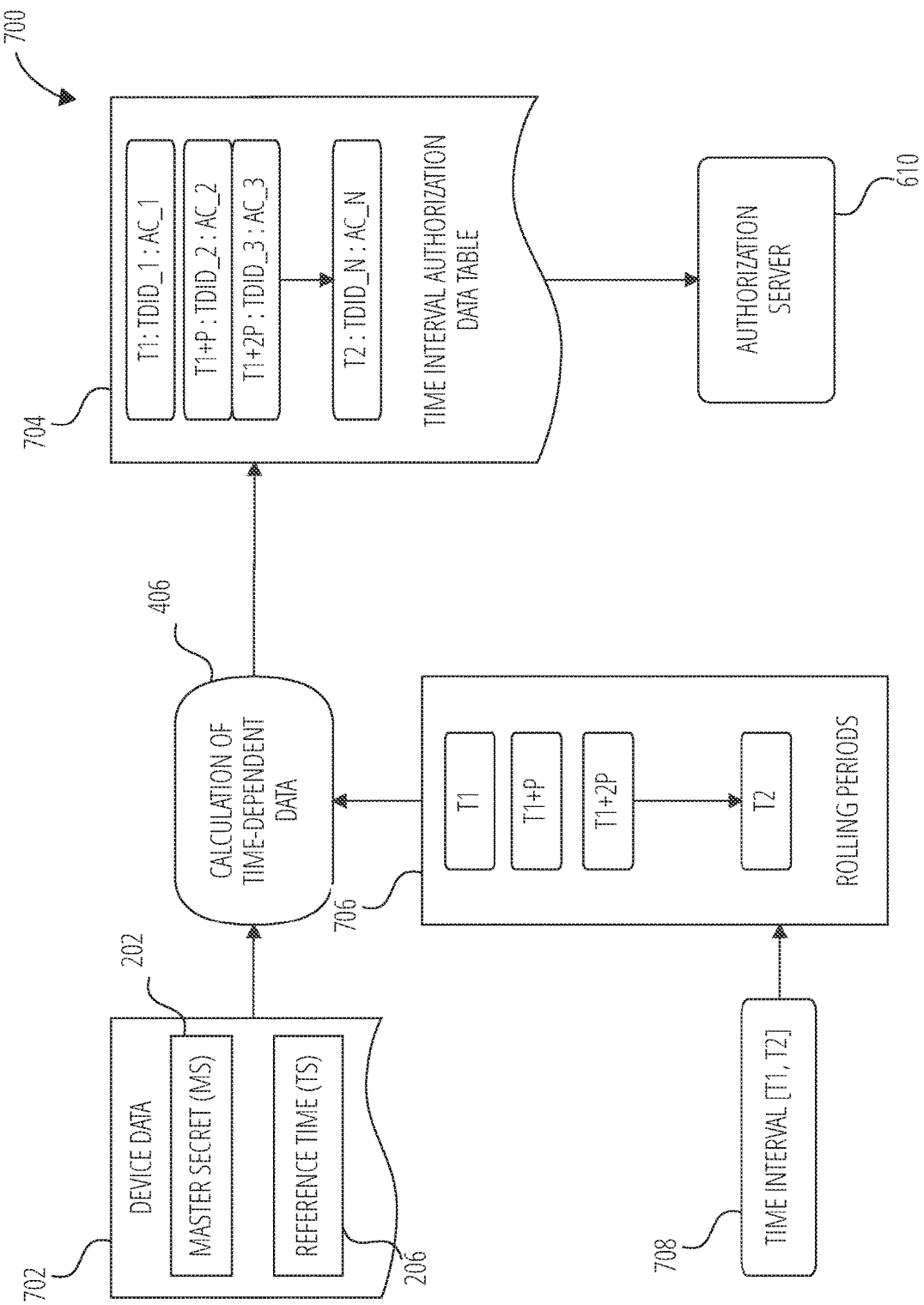
FIG. 7 illustrates methods 700 for authorization data creation by an owner, in accordance with some examples.
Figure 8:
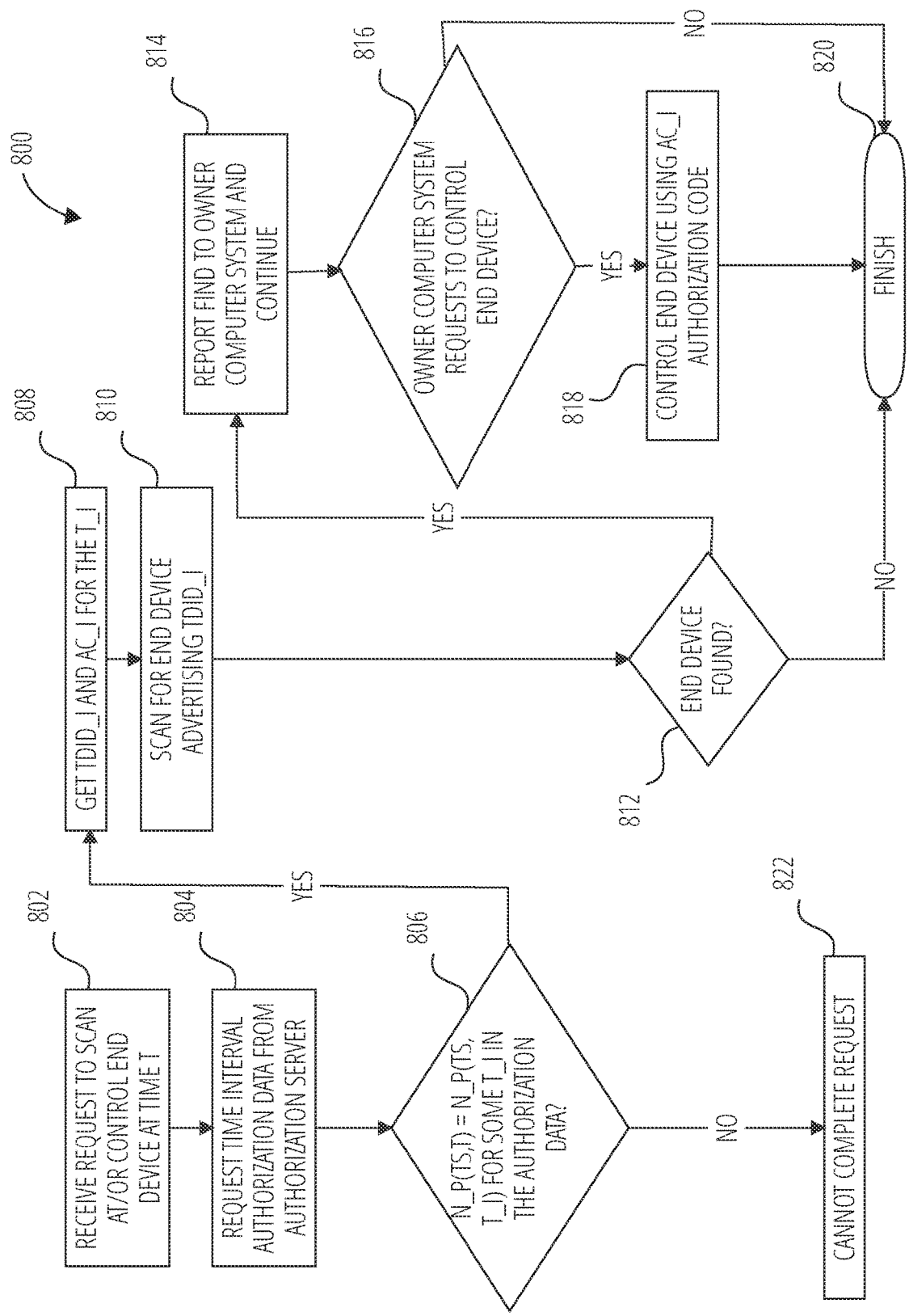
FIG. 8 illustrates a method 800 performed an authorized device access module, in accordance with some examples.

The two EID calculations (EID calculation 302 and EID calculation 304) produce
1. The 32-byte time-dependent identifier (TDID) 208; and
2. Another 32-byte number one-time pad (OTP) 308, which is divided into a 28-byte one-time pad (OTP), which will be used for encrypting the device message to produce encrypted device message (EDM) 210 (EDM), and a 4-byte authorization code (AC) 310, which will be used to control the end device 102 (FIG. 6-FIG. 8).

Figure 4:
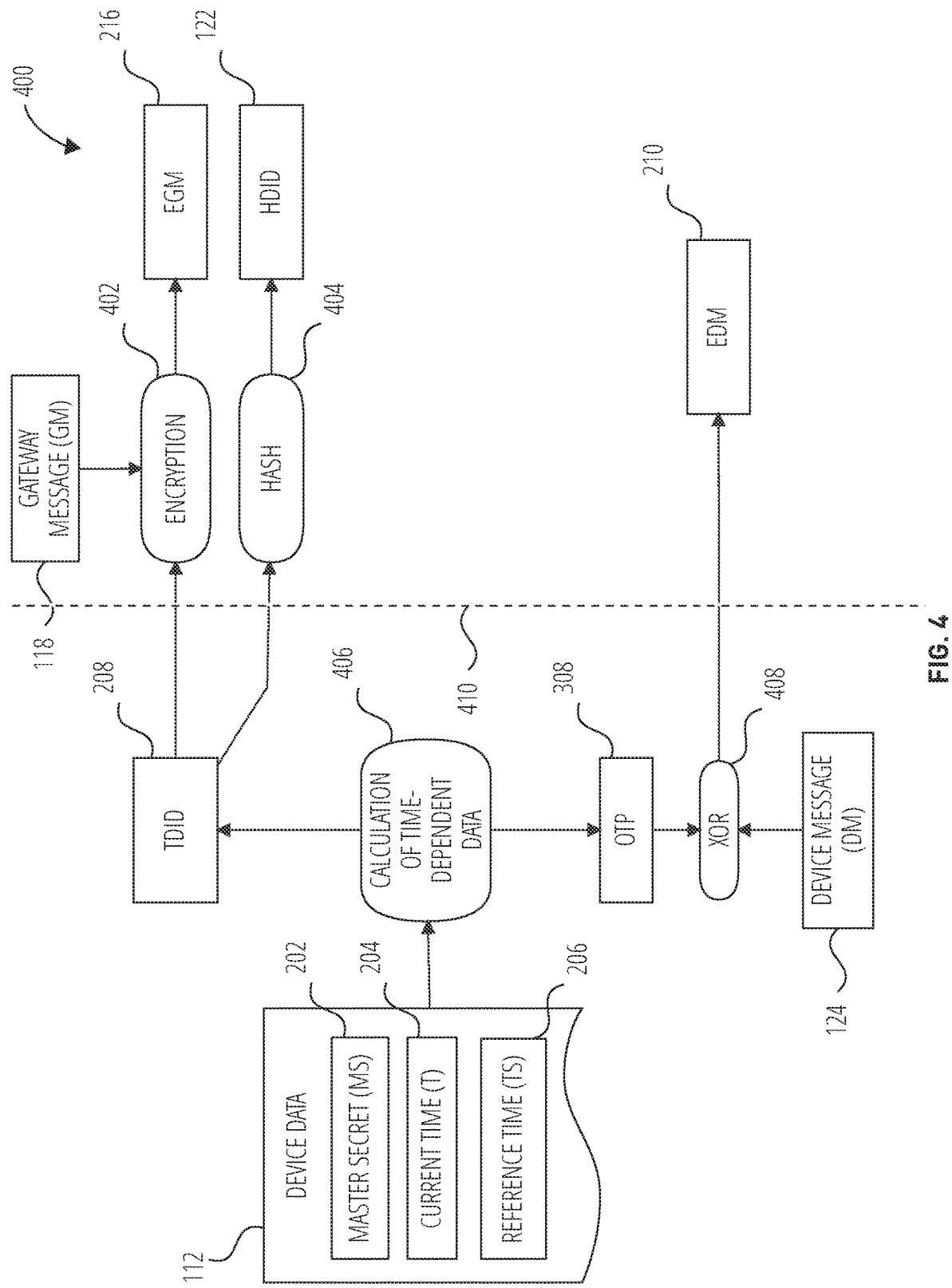
FIG. 4 illustrates methods 400 for device and gateway message calculations, in accordance with some examples.

FIG. 4: Device and Gateway Message Calculations

As shown in FIG. 4, the end device 102 uses the device data 112, for a calculation of time-dependent data 406 using the system in FIG. 3. Two of the outputs are the 32-byte time-dependent identifier (TDID) 208, and the 28-byte one-time pad (OTP) 308).

The time-dependent identifier (TDID) 208 is part of the device advertised data 114 passed from the end device 102 to the gateway 104, as shown in FIG. 1. The gateway 104 processes the device advertised data 114 in two ways. First, it is used as a 32-byte key to perform encryption 402 of the gateway message (GM) 118. The encryption can, for example, use AES-128. The output is the encrypted gateway message (EGM) 216.

Secondly, the time-dependent identifier (TDID) 208 is passed through a hash 404, for example, SHA-256, to produce a 256-byte hashed identifier (HDID) 122.

The system 100 also produces a 28-byte one-time pad (OTP) 308. The end device 102 can use this one-time pad (OTP) 308 to encode a device message 124. If the device message 124 is at most 28 bytes, then the encryption is a simple XOR 408. Note that one device message 124 can be encrypted per rotation period, in which case the one-time pad (OTP) 308 is only encoding any message at most once.

The result of the XOR 408, the encrypted device message (EDM) 210, is passed through the gateway 104. All the components of the gateway output, the hashed device identifier (HDID) 214, the encrypted gateway message (EGM) 216 and the encrypted device message (EDM) 210, are have now been generated.

Figure 5:
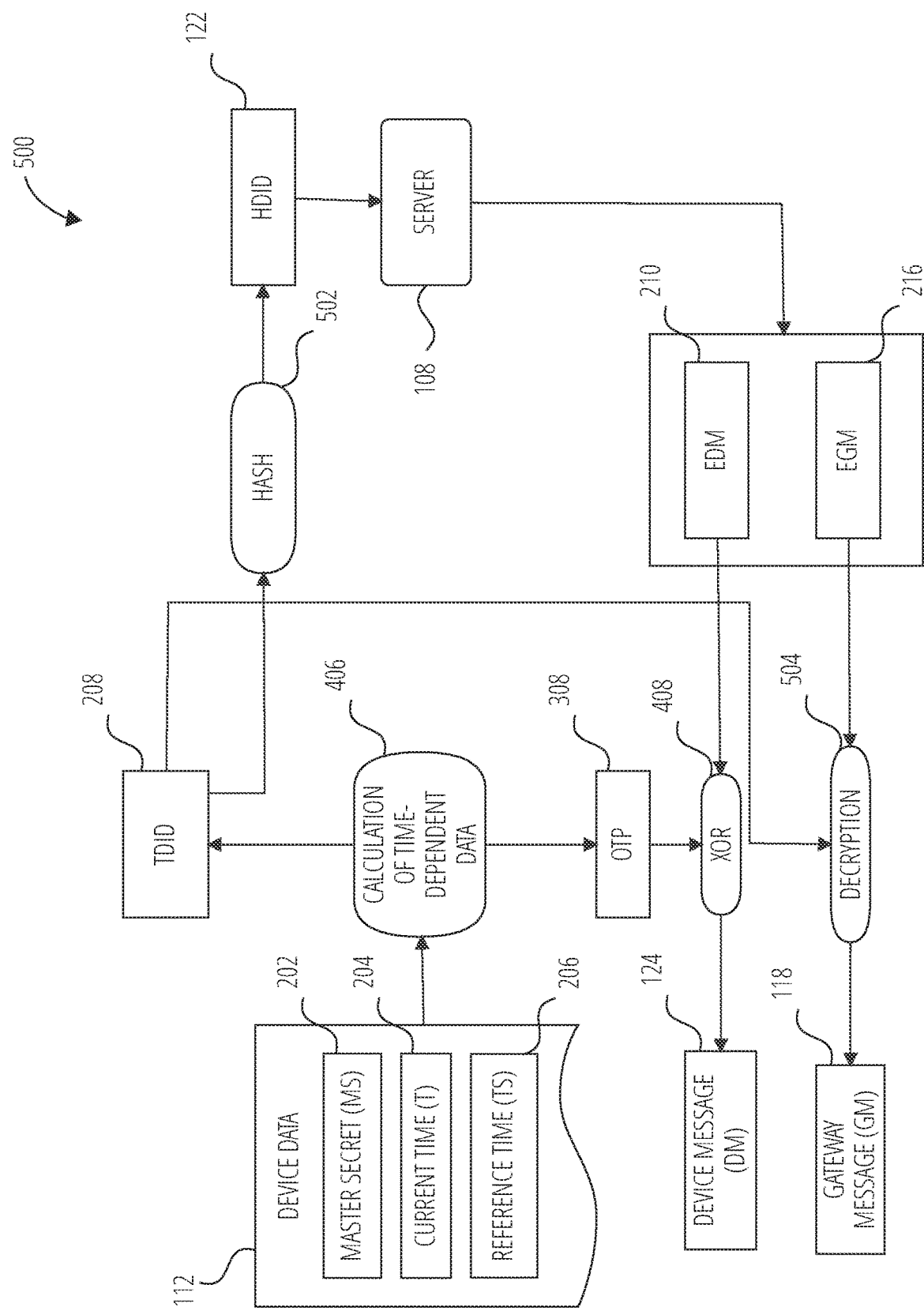
FIG. 5 illustrates methods 500 for device and gateway message calculations, in accordance with some examples.

FIG. 5: Owner Retrieval of Device and Gateway Messages

FIG. 1 shows how the owner computer system 110 sends a hashed identifier (HDID) 122 to the server 108, and (if found) retrieves the device message 124, including the encrypted gateway message (EGM) 216 and the encrypted device message (EDM) 210. FIG. 5 provides details of the process performed by the owner computer system 110.

As discussed in the description of FIG. 1, the owner computer system 110 and the end device 102 share a master secret (MS) 202, and reference time (TS) 206. These, together with the current time (T) 204, are available to the owner computer system 110 and supplied to the calculation of time-dependent data 406, which is described in FIG. 4.

One product of the calculation of time-dependent data 406 is the time-dependent identifier (TDID) 208. The owner computer system 110 passes the time-dependent identifier (TDID) 208 through the same hash 404 as in FIG. 4, to produce the hashed identifier (HDID) 122, which is sent to the server 108. If the server 108 can match the hashed identifier (HDID) 122 with a record, it returns the encrypted device message (EDM) 210 and encrypted gateway message (EGM) 216 to the owner computer system 110. The owner computer system 110 then passes these two encrypted messages through the reverse of the process described in FIG. 4 (e.g., through the XOR 408 and a decryption 504) to generate the device message 124 and the gateway message (GM) 118.

First, the XOR 408 of the encrypted device message (EDM) 210 and the one-time pad (OTP) 308 is calculated, and the result is the device message 124. Second, the encrypted gateway message (EGM) 216 is decrypted (at decryption 504) using the reverse of the encryption 402 in FIG. 4. The decryption 504, like the encryption 402, uses the time-dependent identifier (TDID) 208 as the key.

So, the owner computer system 110 is able to obtain the end device 102 and gateway message (GM) 118, decrypted, from the server 108.

FIG. 6: Owner Authorization of Gateway to Scan for Device and/or Control Device

The owner computer system 110 specifies time interval data in the example form of a time interval 610, and performs a calculation of authorization data 602 (details described below with references to FIG. 7) for a specific device. The calculated time interval authorization data 604 can be used by a gateway 104 or other party besides the owner computer system 110 to recognize the presence of the owner's device and control that device, during (and only during) the specified time interval (time interval 610). This can be done by the gateway 104 or other party without knowledge of the master secret (MS) 202.

The owner computer system 110 calculates the time interval authorization data 604, which can (optionally) be stored in an authorization server 612 until requested and received by a gateway 104. Alternatively, the time interval authorization data 604 can be sent directly to the gateway 104.

An authorized device access module 606 (details in FIG. 8) in the gateway 104 can scan for and recognize the owner's end device 102 during the time interval for which the time interval authorization data 604 is valid. It can also optionally control the end device 102 during this time interval.

FIG. 7: Authorization Data Creation by Owner

FIG. 7 describes methods 700 used by the owner computer system 110 in FIG. 6 to calculate the time interval authorization data 604. These methods 700 uses the same calculation of time-dependent data 406 described with reference to FIG. 4.

As before, the calculation of time-dependent data 406 has inputs of the master secret (MS) 202 and the reference time (TS) 206 (e.g., a starting time). Instead of using one specific current time (T) 204, the calculation of time-dependent data 406 is called for a range of times. A time interval [T1, T2] 708 is specified, containing start and end times T1 and T2. A series of times (e.g., rolling periods 706) starting at T1, ending at T2, and with interval P (the rollover period), is calculated from the time interval [T1, T2] 708. That is, a representative time from each rolling period between T1 and T2 is generated and stored. The calculation of time-dependent data 406 is then called for each of these times (rolling periods 706) so that the output is a time interval authorization data table 704 of the same length as the series of times. Each row in the time interval authorization data table 704 contains the time, and the time-dependent identifier (TDID) 208 and authorization code (AC) 310 for that time period, as described in FIG. 3. As such, then time interval authorization data table 704 is populated with time interval authorization data 604 described with reference to FIG. 6, this time interval authorization data 604 including a time-dependent identifier (TDID) 208 and an authorization code (AC) 310 for each of a range of times This time interval authorization data table 704 is a block of data that can be transferred and stored in the authorization server 610, where it is made available to a gateway 104 as described in FIG. 6, with the details of gateway usage described in FIG. 8.

FIG. 8: Authorized Device Access Module

FIG. 8 is a flowchart illustrating a method 800 performed by the authorized device access module 606 from FIG. 6, contained in a gateway 104.

At operation 802, the authorized device access module 606 receives a request at the current time (T) 204 to scan for, or both scan for and control, an end device 102. This request comes from the gateway 104 itself, or from the owner computer system 110 or a third-party via the gateway 104. The authorized device access module 606 has access to time interval authorization data 604 for this end device 102, either on the authorization server 610 or local to the gateway 104.

At operation 804, the authorized device access module 606 requests this time interval authorization data 604, and at decision operation 806, the authorized device access module 606 looks up the time T in the time interval authorization data 604, to see if there is a time T_I in the time interval authorization data table 704 which falls into the same rolling period as T.

If not, the authorized device access module 606 is not authorized for time T, and request cannot be completed (operation 822). If there is such a T_I, then the authorized device access module 606 can obtain the corresponding TDID_I and AC_I at operation 808. It is then able to scan for and detect current device advertised data 114 from the end device 102, by scanning for end devices currently advertising TDID_I at operation 810.

If such a device is found at decision operation 812, the authorized device access module 606 can notify or report to the owner computer system 110 that the end device 102 has been located at operation 814 via the gateway 104, and optionally exercise some control over the device at decision operation 816. The authorization code AC_I, currently valid, can be sent to the end device 102 at operation 818, which, depending on the device capabilities and configuration, can allow the authorized device access module 606 to control the end device 102 in some way. The method 800 ends at done operation 820.

Figure 9:
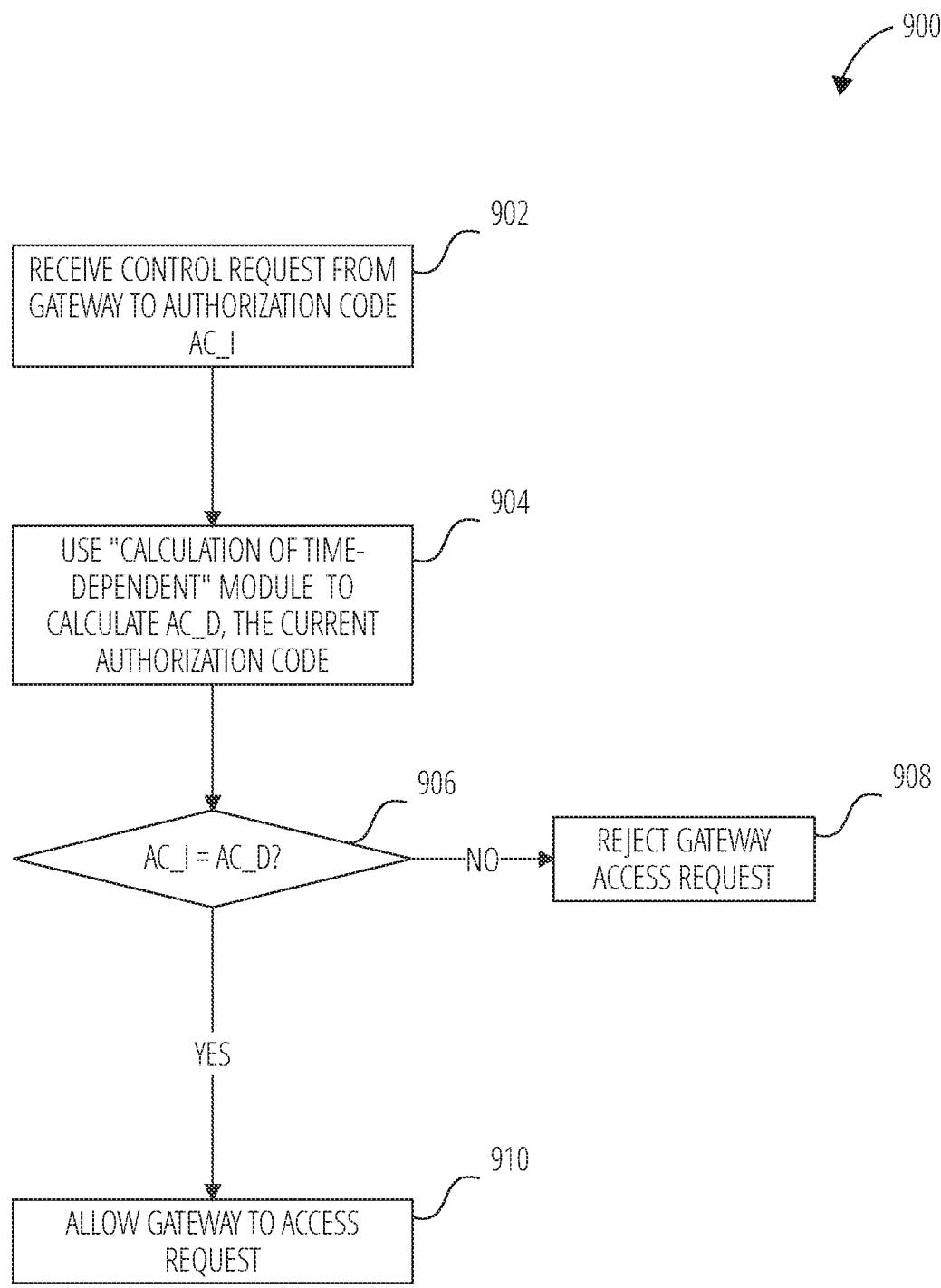
FIG. 9 illustrates a method 900 of handling of control request from a gateway, in accordance with some examples.

FIG. 9: Device Handling of Control Request from Gateway

FIG. 8 shows how the authorization code AC_I is sent to the end device 102, to enable control of the end device 102 by the gateway 104. FIG. 9 describes how the end device 102 handles this communication with the gateway 104.

At operation 902, the end device 102 receives the control request from the gateway 104. This control request contains the authorization code AC_I. The end device 102 is able to generate the correct authorization code AC_D, using the calculation of time-dependent data 406 as described in FIG. 4. The authorization code AC_D is generated accordingly at operation 904. The end device 102 then, at decision operation 906, checks whether AC_I equals AC_D. If not, the end device 102 does not allow control by the gateway 104 at operation 908. If the codes are equal, the end device 102 is allowed control by the gateway 104 at operation 910.

Here are some examples of types of control of the end device 102 by the gateway 104, that could be exercised using the authorization code in this manner:

1. Once the authorization code is received and verified (operation 910), the end device 102 may immediately perform some task, such as beeping or lighting up.
2. The authorization code may, in some examples, be sent with additional data from the gateway 104, which instructs the end device 102 further on how it should behave. For example, the end device 102 could return specific data to the gateway 104 that the gateway has requested.
3. The acceptance of the authorization code on the end device 102 may, in some examples, be the equivalent of a login to the device by the gateway 104, which establishes a session in which the gateway 104 can repeatedly interact with the device for a fixed time or until the gateway 104 closes the session.

Figure 10:
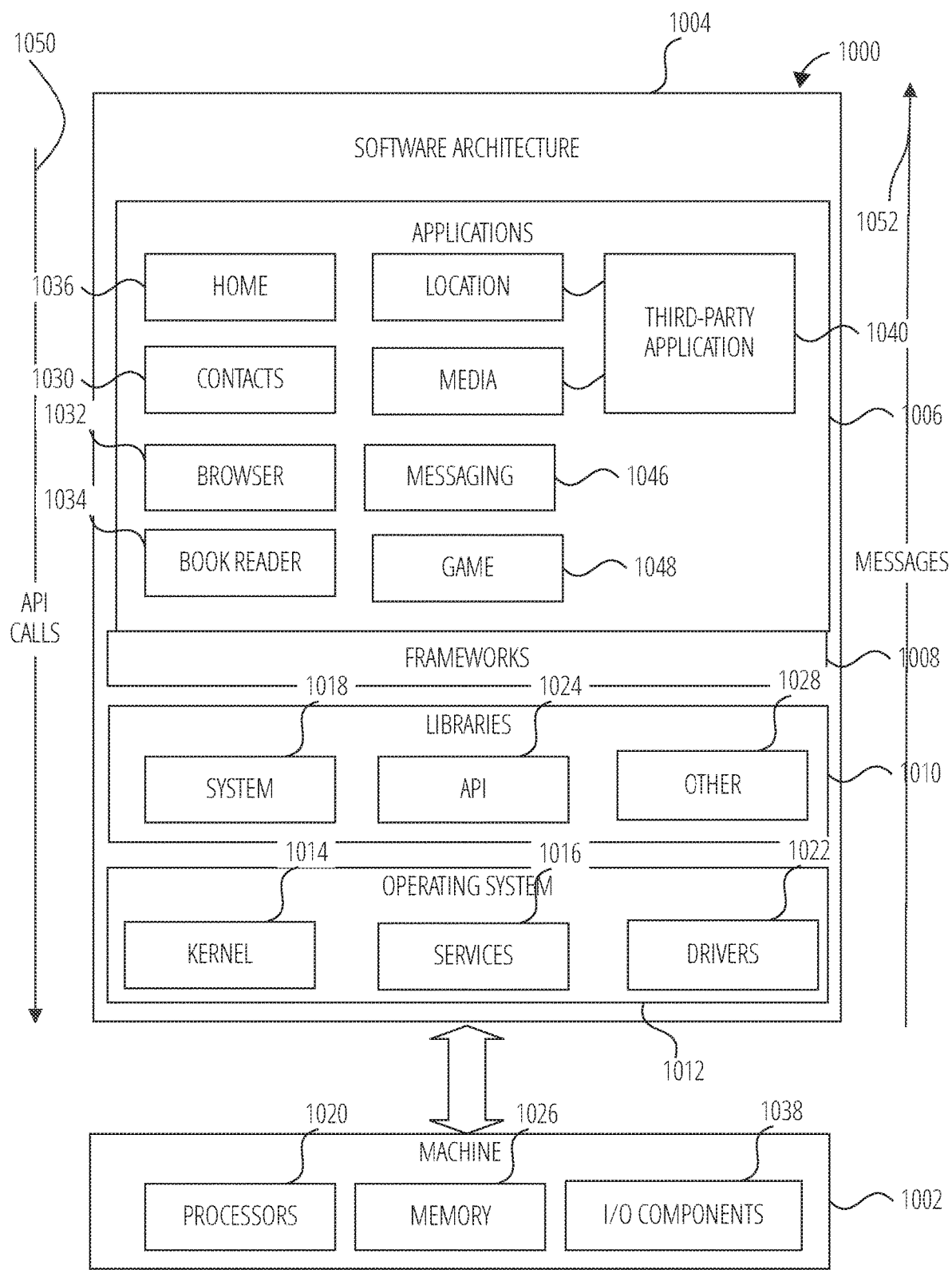
FIG. 10 is a block diagram showing a software architecture within which the present disclosure may be implemented, according to an example.

FIG. 10 is a block diagram 1000 illustrating a software architecture 1004, which can be installed on any one or more of the end devices described herein. The software architecture 1004 is supported by hardware such as a machine 1002 that includes processors 1020, memory 1026, and I/O components 1038. In this example, the software architecture 1004 can be conceptualized as a stack of layers, where each layer provides particular functionality. The software architecture 1004 includes layers such as an operating system 1012, libraries 1010, frameworks 1008, and applications 1006. Operationally, the applications 1006 invoke API calls 1050 through the software stack and receive messages 1052 in response to the API calls 1050.

The operating system 1012 manages hardware resources and provides common services. The operating system 1012 includes, for example, a kernel 1014, services 1016, and drivers 1022. The kernel 1014 acts as an abstraction layer between the hardware and the other software layers. For example, the kernel 1014 provides memory management, processor management (e.g., scheduling), component management, networking, and security settings, among other functionality. The services 1016 can provide other common services for the other software layers. The drivers 1022 are responsible for controlling or interfacing with the underlying hardware. For instance, the drivers 1022 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1010 provide a low-level common infrastructure used by the applications 1006. The libraries 1010 can include system libraries 1018 (e.g., C standard library) that provide functions such as memory allocation functions, string manipulation functions, mathematic functions, and the like. In addition, the libraries 1010 can include API libraries 1024 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1010 can also include a wide variety of other libraries 1028 to provide many other APIs to the applications 1006.

The frameworks 1008 provide a common high-level infrastructure that is used by the applications 1006. For example, the frameworks 1008 provide various graphical user interface (GUI) functions, high-level resource management, and high-level location services. The frameworks 1008 can provide a broad spectrum of other APIs that can be used by the applications 1006, some of which may be specific to a particular operating system or platform.

In an example, the applications 1006 may include a home application 1036, a contacts application 1030, a browser application 1032, a book reader application 1034, a location application 1042, a media application 1044, a messaging application 1046, a game application 1048, and a broad assortment of other applications such as a third-party application 1040. The applications 1006 are programs that execute functions defined in the programs. Various programming languages can be employed to create one or more of the applications 1006, structured in a variety of manners, such as object-oriented programming languages (e.g., Objective-C, Java, or C++) or procedural programming languages (e.g., C or assembly language). In a specific example, the third-party application 1040 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1040 can invoke the API calls 1050 provided by the operating system 1012 to facilitate functionality described herein.

Figure 11:
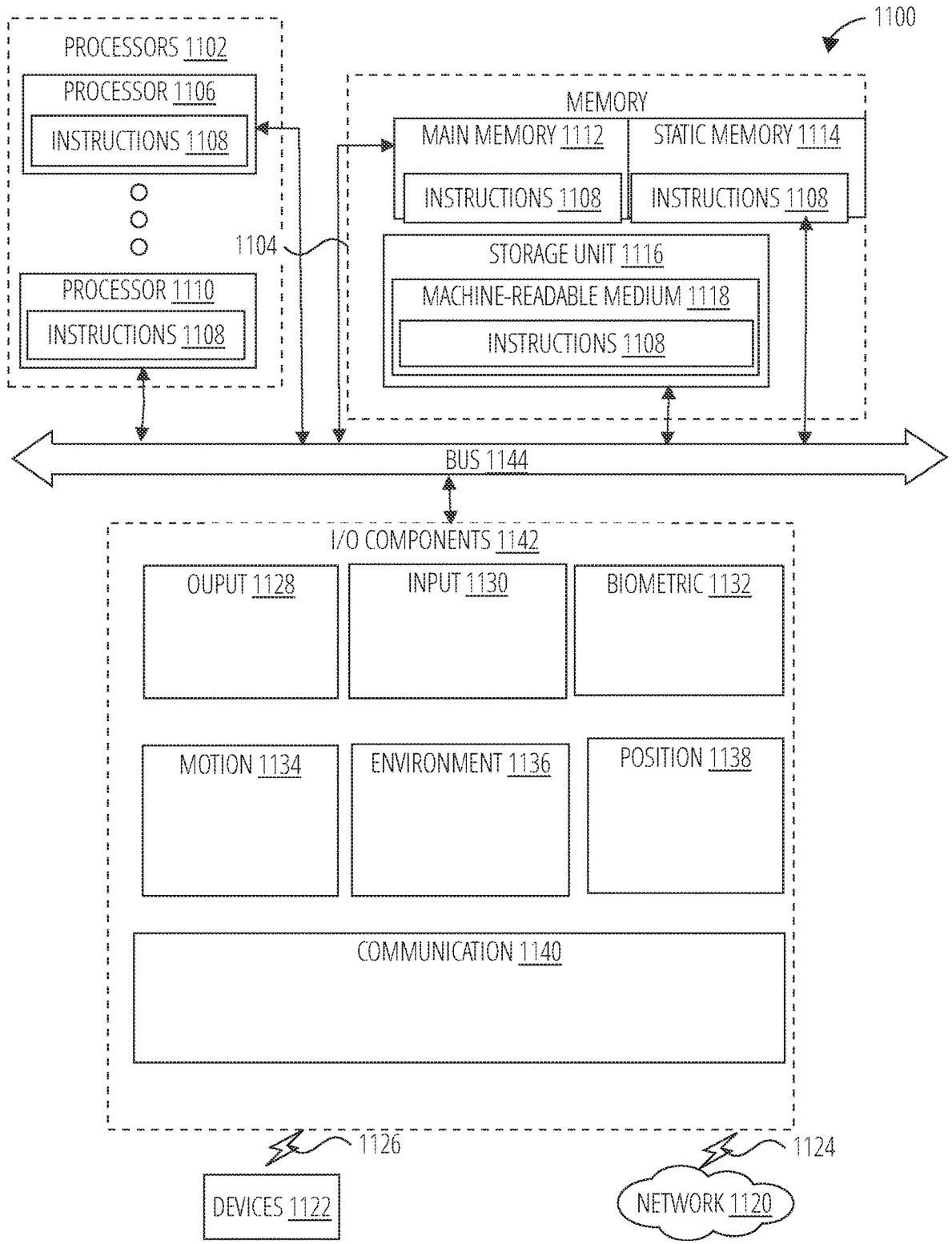
FIG. 11 illustrates a diagrammatic representation of a machine in the form of a computer system within which a set of instructions may be executed for causing the machine to perform any one or more of the methodologies discussed herein, according to an example.

FIG. 11 is a diagrammatic representation of the machine 1100 within which instructions 1108 (e.g., software, a program, an application, an applet, an app, or other executable code) for causing the machine 1100 to perform any one or more of the methodologies discussed herein may be executed. For example, the instructions 1108 may cause the machine 1100 to execute any one or more of the methods described herein. The instructions 1108 transform the general, non-programmed machine 1100 into a particular machine 1100 programmed to carry out the described and illustrated functions in the manner described. The machine 1100 may operate as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1108, sequentially or otherwise, that specify actions to be taken by the machine 1100. Further, while only a single machine 1100 is illustrated, the term "machine" shall also be taken to include a collection of machines that individually or jointly execute the instructions 1108 to perform any one or more of the methodologies discussed herein.

The machine 1100 may include processors 1102, memory 1104, and I/O components 1142, which may be configured to communicate with each other via a bus 1144. In an example, the processors 1102 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an ASIC, a Radio-Frequency Integrated Circuit (RFIC), another Processor, or any suitable combination thereof) may include, for example, a Processor 1106 and a Processor 1110 that execute the instructions 1108. The term "Processor" is intended to include multi-core processors that may comprise two or more independent processors (sometimes referred to as "cores") that may execute instructions contemporaneously. Although FIG. 11 shows multiple processors 1102, the machine 1100 may include a single processor with a single-core, a single processor with multiple cores (e.g., a multi-core processor), multiple processors with a single core, multiple processors with multiples cores, or any combination thereof.

The memory 1104 includes a main memory 1112, a static memory 1114, and a storage unit 1116, both accessible to the processors 1102 via the bus 1144. The main memory 1104, the static memory 1114, and storage unit 1116 store the instructions 1108 embodying any one or more of the methodologies or functions described herein. The instructions 1108 may also reside, completely or partially, within the main memory 1112, within the static memory 1114, within machine-readable medium 1118 within the storage unit 1116, within at least one of the processors 1102 (e.g., within the processor's cache memory), or any suitable combination thereof, during execution thereof by the machine 1100.

The I/O components 1142 may include a wide variety of components to receive input, provide output, produce output, transmit information, exchange information, capture measurements, and so on. The specific I/O components 1142 that are included in a particular machine will depend on the type of machine. For example, portable machines such as mobile phones may include a touch input device or other such input mechanisms, while a headless server machine will likely not include such a touch input device. It will be appreciated that the I/O components 1142 may include many other components that are not shown in FIG. 11. In various examples, the I/O components 1142 may include output components 1128 and input components 1130. The output components 1128 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1130 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further examples, the I/O components 1142 may include biometric components 1132, motion components 1134, environmental components 1136, or position components 1138, among a wide array of other components. For example, the biometric components 1132 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1134 include acceleration sensor components (e.g., accelerometer), gravitation sensor components, rotation sensor components (e.g., gyroscope), and so forth. The environmental components 1136 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1138 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1142 further include communication components 1140 operable to couple the machine 1100 to a network 1120 or devices 1122 via a coupling 1124 and a coupling 1126, respectively. For example, the communication components 1140 may include a network interface component or another suitable device to interface with the network 1120. In further examples, the communication components 1140 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1122 may be another machine or any of a wide variety of peripheral devices (e.g., a peripheral device coupled via a USB).

Moreover, the communication components 1140 may detect identifiers or include components operable to detect identifiers. For example, the communication components 1140 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1140, such as location via Internet Protocol (IP) geolocation, location via Wi-Fi® signal triangulation, location via detecting an NFC beacon signal that may indicate a particular location, and so forth.

The various memories (e.g., memory 1104, main memory 1112, static memory 1114, and/or memory of the processors 1102) and/or storage unit 1116 may store one or more sets of instructions and data structures (e.g., software) embodying or used by any one or more of the methodologies or functions described herein. These instructions (e.g., the instructions 1108), when executed by processors 1102, cause various operations to implement the disclosed embodiments.

The instructions 1108 may be transmitted or received over the network 1120, using a transmission medium, via a network interface device (e.g., a network interface component included in the communication components 1140) and using any one of a number of well-known transfer protocols (e.g., hypertext transfer protocol (HTTP)). Similarly, the instructions 1108 may be transmitted or received using a transmission medium via the coupling 1126 (e.g., a peer-to-peer coupling) to the devices 1122.

Section 4: Anonymity and Security Requirements: Discussion

In this section, we revisit the example anonymity and security requirements listed in Section 2 and discuss how these example requirements may be satisfied by the system as described in Section 3. The numbering here matches the numbering of requirements in Section 2.

1. We can take the other potential parties in turn. Note that no party except the end device 102 and the owner computer system 110 share the master secret (MS) 202, so no party can predict the time-dependent identifier (TDID) 208 or encrypted device data from the end device 102 besides the owner computer system 110.

a. Eavesdroppers: There is no unencrypted information in the advertised data from the device that identifies the owner with the device. Also, the device TDID and the encrypted data from the device changes every rotation period, even if the underlying message stays constant, so an eavesdropper cannot track the location of a device over any length of time, and so identify it by its behavior (where it spends the night, for example) with a particular owner.

b. Gateways: The arguments here are the same as in a.: the gateway does not deal with any owner-identifiable information, and like the eavesdropper cannot track one device over a period of time, because of the changing encrypted data. Similar arguments hold for the proxy.

c. Server: Until the owner queries the server for an HDID, the server has access to no more device information than the gateway, and the same arguments hold as in a. and b. When the owner queries for an HDID, if the server was also eavesdropping or collaborating with a gateway, it could tie the owner to the location of the device whose TDID produced that HDID. If the owner accessed the server through an anonymizing proxy similar to (106) in FIG. 1, however, even this possibility would be removed.

2. This holds because of the changing device ID (TDID) and encryption keys, so that the advertised device content changes every rotation interval, as outlined in 1.a.

3. Again, since the TDID is not predictable beyond the rotation period by any party except the owner, no party can spoof the device. In fact, the owner would not even be able to look up data from the server for a spoofed device, since the queried HDID would not (with very high probability) match any entry in the server database.

4. A server will not be able to identify the gateway submitting a record by the IP address or any other protocol-based data since this is stripped from the gateway submission by the proxy. Also, even though the gateway is an ad hoc member of the network, and has not exchanged keys with the owner, it can send encrypted data to the owner using the key obtained from the device, which only the owner and the device can generate. This key is broadcast locally from the device, and so it is certainly vulnerable to eavesdropping. But any eavesdropper will know the location at which the eavesdropping is taking place, and so the location data added to the device data by the gateway is not going to reveal more information to the eavesdropper than is already known.

EXAMPLES

Example 1

A method for remote authorization of a gateway to communicate with an end device, the method comprising:

accessing time interval data, specified by an owner computer system associated with the end device, the time interval data specifying an access authorization time interval;

using at least one processor, performing a calculation to generate authorization data that is specific to the end device and valid for the access authorization time interval;

accessing the authorization data using the gateway:

performing a scanning function using the gateway, the scanning function to locate the end device: and locating the end device using the gateway.

Example 2

The method according to any one or more of the preceding examples, further comprising, responsive to locating the end device:

notifying the owner computer system of the end device that the end device has been located; and controlling the end device using the gateway, the control of the end device by the gateway being limited to the access authorization time interval.

Example 3

The method according to any one or more of the preceding examples, wherein the gateway includes an authorized end device access module, and the accessing of the authorization data using the gateway further comprises, at the authorized end device access module:

receiving a request to scan for the end device;

requesting the authorization data from the owner computer system of the end device;

receiving the authorization data responsive to the request;

determining that a current time falls within the access authorization time interval; and responsive to determining that the current time falls within the access authorization time interval, obtaining a time-dependent identifier associated with the end device from the owner computer system of the end device.

Example 4

The method according to any one or more of the preceding examples, wherein the performing of the scanning function comprises scanning for advertised data, and wherein the locating of the end device comprises detecting specific advertised data, including the time-dependent identifier associated with the end device.

Example 5

The method according to any one or more of the preceding examples, comprising, at the authorized end device access module, responsive to determining that the current time falls within the access authorization time interval, obtaining an authorization code associated with the end device from the owner computer system of the end device.

Example 6

The method according to any one or more of the preceding examples, comprising transmitting, from the authorized end device access module, the authorization code to the end device in order to facilitate control of the end device using the gateway.

Example 7

The method according to any one or more of the preceding examples, comprising:

transmitting a control request from the authorized end device access module to the end device, the control request including the authorization code associated with the end device;

receiving the control request at the end device;

at the end device, generating a current authorization code using at least a shared master secret, shared between the end device and the owner computer system, current time data, and reference time data;

comparing the current authorization code with the authorization code included in the control request:

detecting a correspondence between the current authorization code and the authorization code included in the control request; and responsive to the detection of the correspondence, allowing the control request received from the authorized end device access module.

Example 8

The method according to any one or more of the preceding examples, wherein the control request includes instructions that cause the end device to perform a specific function based on the control request.

Example 9

A system for remote authorization of a gateway to communicate with an end device, the system comprising:

at least one processor: and a computer-readable medium storing instructions, that when executed by the at least one processor, cause the at least one processor to perform operations of:

accessing time interval data, specified by an owner computer system associated with the end device, the time interval data specifying an access authorization time interval;

performing a calculation to generate authorization data that is specific to the end device and valid for the access authorization time interval;

accessing the authorization data using the gateway;

performing a scanning function using the gateway, the scanning function to locate the end device: and locating the end device using the gateway.

Example 10

The system according to any one or more of the preceding examples, wherein the instructions further cause the at least one processor to perform the operations of:

responsive to locating the end device:

notifying the owner computer system that the end device has been located; and controlling the end device using the gateway, the control of the end device by the gateway being limited to the access authorization time interval.

Example 11

The system according to any one or more of the preceding examples, wherein the gateway includes an authorized end device access module, and the accessing of the authorization data using the gateway further comprises, at the authorized end device access module:

receiving a request to scan for the end device;

requesting the authorization data from the owner computer system of the end device;

receiving the authorization data responsive to the request;

determining that a current time falls within the access authorization time interval; and responsive to determining that the current time falls within the access authorization time interval, obtaining a time-dependent identifier associated with the end device from the owner computer system of the end device.

Example 12

The system according to any one or more of the preceding examples, wherein the performing of the scanning function comprises scanning for advertised data, and wherein the locating of the end device comprises detecting specific advertised data, including the time-dependent identifier associated with the end device.

Example 13

The system according to any one or more of the preceding examples, wherein the instructions further cause the at least one processor to perform the operations of:
at the authorized end device access module, responsive to determining that the current time falls within the access authorization time interval, obtaining an authorization code associated with the end device from the owner computer system of the end device.

Example 14

The system according to any one or more of the preceding examples, wherein the instructions further cause the at least one processor to perform the operations of transmitting, from the authorized end device access module, the authorization code to the end device in order to facilitate control of the end device using the gateway.

Example 15

The system according to any one or more of the preceding examples wherein the instructions further cause the at least one processor to perform the operations of:
transmitting a control request from the authorized end device access module to the end device, the control request including the authorization code associated with the end device;
receiving the control request at the end device;
at the end device, generating a current authorization code using at least a shared master secret, shared between the end device and the owner computer system, current time data, and reference time data;
comparing the current authorization code with the authorization code included in the control request;
detecting a correspondence between the current authorization code and the authorization code included in the control request; and
responsive to the detection of the correspondence, allowing the control request received from the authorized end device access module.

Example 16

The system according to any one or more of the preceding examples, wherein the control request includes instructions that cause the end device to perform a specific function based on the control request.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Computer-readable medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Gateway" refers to serve an intermediaries for communication between the owner computer systems and the end devices. The gateways may not be under the control of the owner computer systems. For example, the gateways may belong to a different individual or organization from the owners. The term "gateway" may be used to refer to either the gateway device or the individual or organization controlling that gateway device.

"Machine-Storage Medium" refers to a single storage device or multiple storage devices and/or media (e.g., a centralized or distributed database, and/or associated caches and servers) that store executable instructions, routines and/or data. The term shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "Machine-Storage Medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "Signal Medium."

"Module" refers to logic having boundaries defined by function or subroutine calls, branch points, application program interfaces (APIs), or other technologies that provide for the partitioning or modularization of particular processing or control functions. Modules are typically combined via their interfaces with other modules to carry out a machine process. A module may be a packaged functional hardware unit designed for use with other components and a part of a program that usually performs a particular function of related functions. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein. In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations. Accordingly, the phrase "hardware module" (or "hardware-implemented module") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time. Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information). The various operations of example methods and routines described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors. Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

"Processor" refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"Signal medium" refers to any intangible medium that is capable of storing, encoding, or carrying the instructions for execution by a machine and includes digital or analog communications signals or other intangible media to facilitate communication of software or data. The term "Signal Medium" shall be taken to include any form of a modulated data signal, carrier wave, and so forth. The term "modulated data signal" means a signal that has one or more of its characteristics set or changed in such a matter as to encode information in the signal. The terms "transmission medium" and "Signal Medium" mean the same thing and may be used interchangeably in this disclosure.

What is claimed is:

1. A method of operating a gateway for remote authorization of the gateway to communicate with an end device associated with an owner computer system, the method comprising:
  accessing authorization data from the owner computer system, the authorization data generated at the owner computer system by accessing time interval data specifying an access authorization time interval for control of the end device and specified by the owner computer system, the authorization data being specific to the end device and valid for the access authorization time interval, wherein the accessing of the authorization data further comprises:
    receiving a request to scan for the end device;
    requesting the authorization data from the owner computer system;
    receiving the authorization data from the owner computer system responsive to the request;
    determining drat a current time falls within the access authorization time interval; and
    responsive to determining that the current time falls within the access authorization time interval, retrieving a corresponding time-dependent identifier associated with the end device from the authorization data;
  performing a scanning function to locate the end device by scanning for end device advertised data, including the time-dependent identifier associated with the end device;
  locating the end device by detecting specific end device advertised data, including the time-dependent identifier associated with the end device; and
  responsive to locating the end device, notifying the owner computer system that the end device has been located.

2. The method of claim 1, comprising, at the gateway, responsive to determining that the current time fails within the access authorization time interval, obtaining an authorization code associated with the end device from the authorization data from the owner computer system of the end device.

3. The method of claim 2, comprising transmitting, from the gateway, the authorization code to the end device in order to facilitate control of the end device using the gateway.

4. The method of claim 3, comprising:
  transmitting a control request from the gateway to the end device, the control request including the authorization code associated with the end device;
  receiving the control request at the end device;
  at the end device, generating a current authorization code using at least a shared master secret, shared between the end device and the owner computer system, current time data, and reference time data;
  comparing the current authorization code with the authorization code included in the control request;
  detecting a correspondence between the current authorization code and the authorization code included in the control request; and
  responsive to the detection of the correspondence, allowing the control request received from the gateway.

5. The method of claim 4, wherein the control request includes instructions that cause the end device to perform a specific function based on the control request.

6. A system of operating a gateway for remote authorization of the gateway to communicate with an end device associated with an owner computer system, the system comprising:
  at least one hardware-implemented processor; and
  a non-transitory computer-readable medium storing instructions, that when executed by the at least one hardware-implemented processor, cause the at least one hardware-implemented processor to perform operations of:
  accessing authorization data from the owner computer system, the authorization data generated at the owner computer system by accessing time interval data specifying an access authorization time interval for control of the end device and specified by the owner computer system, the authorization data being specific to the end device and valid for the access authorization time interval, wherein the accessing of the authorization data further comprises:
    receiving a request to scan for the end device;
    requesting the authorization data from the owner computer system;
    receiving the authorization data from the owner computer system responsive to the request;
    determining that a current time falls within the access authorization time interval; and
    responsive to determining that the current time falls within the access authorization time interval, retrieving a corresponding time-dependent identifier associated with the end device from the authorization data;
  performing a scanning function to locate the end device by scanning for end device advertised data, including the time-dependent identifier associated with the end device;
  locating the end device by detecting specific end device advertised data, including the time-dependent identifier associated with the end device; and
  responsive to locating the end device, notifying the owner computer system that the end device has been located.

7. The system of claim 6, wherein the instructions further cause the at least one hardware-implemented processor to perform the operations of:
  at the gateway, responsive to determining that the current time fails within the access authorization time interval, obtaining an authorization code associated with the end device from the authorization data from the owner computer system of the end device.

8. The system of claim 7, wherein the instructions further cause the at least one hardware-implemented processor to perform the operations of transmitting, from the gateway, the authorization code to the end device in order to facilitate control of the end device using the gateway.

9. The system of claim 8, wherein the instructions further cause the at least one hardware-implemented processor to perform the operations of:

transmitting a control request from the gateway to the end device, the control request including the authorization code associated with the end device;
receiving the control request at the end device;
at the end device, generating a current authorization code using at least a shared master secret, shared between the end device and the owner computer system, current time data, and reference time data;
comparing the current authorization code with the authorization code included in the control request;
detecting a correspondence between the current authorization code and the authorization code included in the control request; and
responsive to the detection of the correspondence, allowing the control request received from the gateway.

10. The system of claim 9, wherein the control request includes instructions that cause the end device to perform a specific function based on the control request.

\* \* \* \* \*

UNITED STATES PATENT AND TRADEMARK OFFICE
CERTIFICATE OF CORRECTION

| | |
|---|---|
| PATENT NO. | : 11,329,994 B2 |
| APPLICATION NO. | : 16/896712 |
| DATED | : May 10, 2022 |
| INVENTOR(S) | : Gous et al. |

It is certified that error appears in the above-identified patent and that said Letters Patent is hereby corrected as shown below:

In the Claims

In Column 21, Line 33, in Claim 1, delete "drat" and insert --that-- therefor

In Column 21, Line 50, in Claim 2, delete "fails" and insert --falls-- therefor

In Column 22, Line 56, in Claim 7, delete "fails" and insert --falls-- therefor

Signed and Sealed this
Thirteenth Day of December, 2022

Katherine Kelly Vidal
*Director of the United States Patent and Trademark Office*